United States Patent
Kakura

(10) Patent No.: US 11,962,521 B2
(45) Date of Patent: *Apr. 16, 2024

(54) RADIO COMMUNICATION APPARATUS, METHOD, PROGRAM, NON-TRANSITORY COMPUTER READABLE RECORDING MEDIUM, AND SYSTEM

(71) Applicant: NEC Corporation, Tokyo (JP)

(72) Inventor: Yoshikazu Kakura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,760

(22) Filed: Apr. 21, 2022

(65) Prior Publication Data

US 2022/0247524 A1 Aug. 4, 2022

Related U.S. Application Data

(63) Continuation of application No. 16/633,022, filed as application No. PCT/JP2018/018286 on May 11, 2018, now Pat. No. 11,323,215.

(30) Foreign Application Priority Data

Jul. 25, 2017 (JP) .................... 2017-143394

(51) Int. Cl.
*H04L 5/00* (2006.01)
*H04W 72/23* (2023.01)
*H04W 72/542* (2023.01)

(52) U.S. Cl.
CPC .......... *H04L 5/0007* (2013.01); *H04L 5/0048* (2013.01); *H04W 72/23* (2023.01); *H04W 72/542* (2023.01)

(58) Field of Classification Search
CPC .. H04L 5/0007; H04L 5/0048; H04W 72/042; H04W 72/085
See application file for complete search history.

(56) References Cited

U.S. PATENT DOCUMENTS 7,394,864 B2 * 7/2008 Webster .............. H04L 25/0212
375/295
7,859,985 B2 * 12/2010 Schmidl ................ H04L 1/1845
370/320

(Continued)

FOREIGN PATENT DOCUMENTS

BR 112019013179 A2 * 12/2019 ............ H04W 16/28
CN 109983796 A * 7/2019 ............ H04W 16/28

(Continued)

OTHER PUBLICATIONS

"WF on UL Resource Allocation for PUSCH with DFT-s-OFDM waveform in NR", NEC, NTT DOCOMO, Panasonic, OPPO, Ericsson, Nokia, ASB, 3GPP TSG-RAN WG1 NR Ad-Hoc#2, R1-1711753, Jun. 27-30, 2017, 3 pages, Qingdao, P.R. China.

(Continued)

*Primary Examiner* — Eric Nowlin
(74) *Attorney, Agent, or Firm* — Sughrue Mion, PLLC

(57) ABSTRACT

In order to enable control related to radio communication to be performed more appropriately when radio transmission schemes coexist, a radio communication apparatus according to an example aspect of the present invention includes a radio communication processing unit configured to perform communication using a first radio transmission scheme within a frequency band, wherein the radio communication processing unit is configured to perform communication using a second radio transmission scheme within a bandwidth part of the frequency band, radio resources within the (Continued)

bandwidth part being allocable for communication using the second radio transmission scheme.

3 Claims, 15 Drawing Sheets

(56) References Cited

U.S. PATENT DOCUMENTS

| | | | | |
|---|---|---|---|---|
| 8,570,946 | B2* | 10/2013 | Schmidl | H04L 1/1845 370/320 |
| 8,705,441 | B2* | 4/2014 | Xu | H04L 27/2613 370/208 |
| 9,113,491 | B2 | 8/2015 | Montojo | H04W 52/325 |
| 10,367,613 | B2* | 7/2019 | Zhou | H04W 72/1263 |
| 10,749,644 | B2 | 8/2020 | Islam | H04L 5/0007 |
| 10,945,274 | B2* | 3/2021 | Zhang | H04W 72/12 |
| 11,063,710 | B2 | 7/2021 | Chen | H04L 5/0035 |
| 11,129,203 | B2* | 9/2021 | Ohara | H04W 74/008 |
| 11,483,107 | B2* | 10/2022 | Zhang | H04L 27/2613 |
| 11,622,386 | B2* | 4/2023 | Takahashi | H04W 36/08 370/330 |
| 2005/0207335 | A1* | 9/2005 | Schmidl | H04L 1/1845 370/206 |
| 2010/0091919 | A1* | 4/2010 | Xu | H04L 5/0023 375/346 |
| 2011/0064029 | A1* | 3/2011 | Schmidl | H04L 1/1845 370/328 |
| 2011/0176498 | A1 | 7/2011 | Montojo | H04W 72/048 370/329 |
| 2011/0255624 | A1 | 10/2011 | Nakamura et al. | |
| 2012/0294300 | A1 | 11/2012 | Tomita et al. | |
| 2012/0320995 | A1 | 12/2012 | Dabak | H04B 3/54 375/257 |
| 2012/0328044 | A1 | 12/2012 | Yokomakura et al. | |
| 2015/0029917 | A1 | 1/2015 | Kim | H04W 52/0209 370/311 |
| 2017/0317740 | A1 | 11/2017 | Basu Mallick | H04W 88/04 |
| 2017/0324524 | A1* | 11/2017 | Zhou | H04W 72/044 |
| 2017/0332387 | A1* | 11/2017 | Zhang | H04W 72/12 |
| 2017/0367003 | A1 | 12/2017 | Zhang et al. | |
| 2018/0048435 | A1 | 2/2018 | Islam | H04L 5/0007 |
| 2019/0324111 | A1 | 10/2019 | Marshall | G01S 5/145 |
| 2020/0084301 | A1 | 3/2020 | Guerrieri | H04L 67/12 |
| 2020/0128586 | A1* | 4/2020 | Takahashi | H04W 74/0833 |
| 2020/0204308 | A1 | 6/2020 | Chen | H04W 72/1268 |
| 2020/0287731 | A1 | 8/2020 | Werner | H04L 5/0007 |
| 2021/0120588 | A1* | 4/2021 | Ohara | H04W 72/046 |
| 2021/0306120 | A1 | 9/2021 | Chen | H04W 72/1268 |
| 2023/0370212 | A1* | 11/2023 | Horn | H04W 28/0215 |

FOREIGN PATENT DOCUMENTS

| | | | | |
|---|---|---|---|---|
| CN | 109983796 | B * | 3/2022 | H04W 16/28 |
| EP | 3443795 | B1 * | 3/2021 | H04L 27/2602 |
| EP | 3836474 | A1 * | 6/2021 | H04L 27/2602 |
| ES | 2865442 | T3 * | 10/2021 | H04L 27/2602 |
| JP | 2011-142404 | A | 7/2011 | |
| JP | 6937324 | B2 * | 9/2021 | H04W 16/28 |
| WO | 2010/050384 | A1 | 5/2010 | |
| WO | 2011/096062 | A1 | 8/2011 | |
| WO | 2016/141518 | A1 | 9/2016 | |
| WO | WO-2018123483 | A1 * | 7/2018 | H04W 16/28 |

OTHER PUBLICATIONS

"On Resource Allocation in the Frequency Domain", Ericsson, 3GPP TSG RAN WG1 NR Ad-Hoc#2, R1-1711499, Jun. 27-30, 2017, pp. 1-4, Qingdao, P.R. China.

"On default bandwidth part", Panasonic, 3GPP TSG RAN WG1 NR Ad-Hoc#2, R1-1710787, Jun. 27-30, 2017, pages 1-5, Qingdao, P.R. China.

"NR UL scheduling mechanism", CATT, 3GPP TSG RAN WG1 Meeting #89, R1-1707508, May 15-19, 2017, 2 pages, Hangzhou, P.R. China.

"3rd Generation Partnership Project; Technical Specification Group Radio Access Network; Evolved Universal Terrestrial Radio Access (E-UTRA); Physical Channels and Modulation (Release 8)", 3GPP TS 36.211 V8.6.0, Mar. 2009, pp. 1-83.

"3rd Generation Partnership Project; Technical Specification Group Radio Access Network; Study on New Radio (NR) Access Technology; Physical Layer Aspects (Release 14)", 3GPP TR 38.802 V1.2.0, Feb. 2017, pp. 1-83.

International Search Report for PCT/IP2018/018286 dated Aug. 7, 2018 (PCT/ISA/210).

Written Opinion of the International Searching Authority for PCT/JP2018/018266 dated Aug. 7, 2018.

United States Office Communication of U.S. Appl. No. 16/633,022 dated Jul. 8, 2021.

United States Office Communication of U.S. Appl. No. 16/633,022 dated Nov. 3, 2021.

United States Notice of Allowance of U.S. Appl. No. 16/633,022 dated Jan. 12, 2022.

Qualcomm Incorporated, OFDM and SC-FDM Support for Uplink, Aug. 22, 2016, 3GPP TSG-RAN WG1 #86, Tdoc: R1-166354 (Year: 2016).

Interdigital Communications, Coexistence of CP OFDM and CP DFT-s-OFDM for NR UL, Oct. 10, 2016, 3GPP TSG RAN WG1 Meeting #86bis, Tdoc: R1-1609687 (Year: 2016).

Mitsubishi Electric, Coexistence of DFT-s-OFOM and OFDM in UL below 40GHz. Oct. 10, 2016, 3GPP TSG-RAN WG1 #86bis , Tdoc: R1-1610224 (Year: 2016).

Mitsubishi Electric, On Common UL Control Design between DFT-s-OFDM and OFDM. 14th Nevada 2016, 3GPP TSG-RAN WG1 #86bis, Tdoc: R1-1612376 (Year: 2016).

Huawei et al., Discussion on UL MU-MIMO between CP-OFDM and DFT-s-OFDM for NR, Jan. 16, 2017, 3GPP TSG RAN WG1 NR Ad Hoc Meeting, Tdoc: R1-1700409 (Year: 2017).

Vivo, PAE Considerations on Supporting CP-OFDM and DFT-&-OFDM, Apr. 3, 2017, 3GPP TSG RAN WG1 88bis Meeting. Tdoc: R1-1704503 (Year: 2017).

JP Office Action for JP Application No. 2021-192895, dated Jan. 10, 2023 with English Translation.

NEC Corporation, "NEC's proposals for LTE Advanced", 3GPP RAN IMT-Advanced Workshop, REV-080022, Apr. 7-8, 2008, pp. 1-27.

Ericsson, "Uplink inter-cell interference coordination", 3GPP TSG-RAN WG1 #51, R1-074851, Nov. 5-9, 2007, pp. 1-3.

Qualcomm Incorporated, "UL waveform configuration", 3GPP TSG-RAN WG1 #87, R1-1612075, Nov. 14-18, 2016, pp. 1-6.

JP Office Action for JP Application No. 2021-192895, dated Jun. 6, 2023 with English Translation.

\* cited by examiner

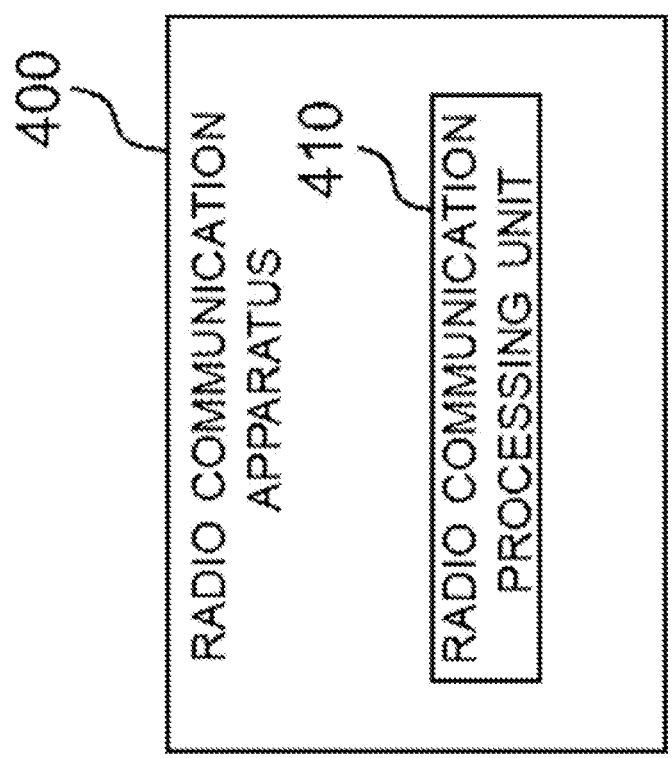

RADIO COMMUNICATION APPARATUS, METHOD, PROGRAM, NON-TRANSITORY COMPUTER READABLE RECORDING MEDIUM, AND SYSTEM

CROSS-REFERENCE TO RELATED APPLICATIONS

The present application is a continuation application of U.S. patent application Ser. No. 16/633,022 filed on Jan. 22, 2020, which is a National Stage Entry of international application PCT/JP2018/018286 filed on May 11, 2018, which claims the benefit of priority from Japanese Patent Application 2017-143394 filed on Jul. 25, 2017, the disclosures of all of which are incorporated in their entirety by reference herein.

BACKGROUND

Technical Field

The present invention relates to a radio communication apparatus, a method, a program, a non-transitory computer readable recording medium, and a system.

Background Art

In Long Term Evolution (LTE) standardized in the 3rd Generation Partnership Project (3GPP), discrete Fourier transform spread orthogonal frequency division multiplexing (DFT-S-OFDM) is adopted as a radio transmission scheme to be used for uplink data transmission and reception (NPL 1). In DFT-S-OFDM, mapping of a discrete Fourier transform (DFT) output to an inverse fast Fourier transform (IFFT) input is limited to subcarriers that are contiguous on a frequency axis, to generate a single-carrier signal having a low peak power, which enables wide coverage.

On the other hand, currently, standardization of New Radio (NR) supporting a wider frequency band than that of LTE is underway by 3GPP. In NR, to enable more flexible radio resource allocation, orthogonal frequency division multiplexing (OFDM) is adopted as a radio transmission scheme to be used for uplink data transmission and reception. OFDM is a multi-carrier transmission scheme and is highly flexible with respect to allocation since radio resources that are discontiguous on a frequency axis are allocated. However, a peak power in this scheme is higher than that in a single-carrier transmission scheme, and hence the coverage results in being small.

To enlarge the coverage, in 3GPP, DFT-S-OFDM is adopted as a radio transmission scheme to be used for uplink data transmission and reception in NR, together with OFDM (NPL 2). Note that PTL 1 discloses a technique for using DFT-S-OFDM and clustered-DFT-S-OFDM.

CITATION LIST

Patent Literature

[PTL 1] JP 2011-142404 A

Non Patent Literature

[NPL 1] 3GPP TS 36.211 (V8.6.0), "Evolved Universal Terrestrial Radio Access (E-UTRA); Physical channels and modulation", March 2009.

[NPL 2] 3GPP TR 38.802 V1.2.0, "3rd Generation Partnership Project; Technical Specification Group Radio Access Network; Study on New Radio (NR) Access Technology; Physical Layer Aspects (Release 14)", February 2017.

SUMMARY

Technical Problem

Since OFDM and DFT-S-OFDM are both adopted as radio transmission schemes as described above, OFDM transmission and DFT-S-OFDM transmission may coexist within the same transmission time interval. When such radio transmission schemes coexist without any restriction, control related to radio communication may be difficult or inefficient.

An example object of the present invention is to provide a radio communication apparatus, a method, a program, a non-transitory computer readable recording medium, and a system that enable control related to radio communication to be performed more appropriately when radio transmission schemes coexist.

Solution to Problem

A radio communication apparatus according to an example aspect of the present invention includes a radio communication processing unit configured to perform communication using a first radio transmission scheme within a frequency band, wherein the radio communication processing unit is configured to perform communication using a second radio transmission scheme within a bandwidth part of the frequency band, radio resources within the bandwidth part being allocable for communication using the second radio transmission scheme.

A method according to an example aspect of the present invention includes performing communication using a first radio transmission scheme within a frequency band, and performing communication using a second radio transmission scheme within a bandwidth part of the frequency band, radio resources within the bandwidth part being allocable for communication using the second radio transmission scheme.

A program according to an example aspect of the present invention is a program that causes a processor to execute performing communication using a first radio transmission scheme within a frequency band, and performing communication using a second radio transmission scheme within a bandwidth part of the frequency band, radio resources within the bandwidth part being allocable for communication using the second radio transmission scheme.

A non-transitory computer readable recording medium according to an example aspect of the present invention is a non-transitory computer readable recording medium having recorded thereon a program that causes a processor to execute performing communication using a first radio transmission scheme within a frequency band, and performing communication using a second radio transmission scheme within a bandwidth part of the frequency band, radio resources within the bandwidth part being allocable for communication using the second radio transmission scheme.

A system according to an example aspect of the present invention includes a base station, and a terminal apparatus, wherein the base station is configured to perform communication using a first radio transmission scheme within a frequency band, and perform communication using a second radio transmission scheme within a bandwidth part of the frequency band, radio resources within the bandwidth part being allocable for communication using the second radio transmission scheme, and wherein the terminal apparatus is configured to perform communication using the first radio transmission scheme within the frequency band, and perform communication using the second radio transmission scheme within the bandwidth part.

Advantageous Effects of Invention

According to the present invention, it is possible to perform control related to radio communication more appropriately when radio transmission schemes coexist. Note that, according to the present invention, instead of or together with the above effects, other effects may be exerted.

BRIEF DESCRIPTION OF THE DRAWINGS

FIG. 15 is a block diagram illustrating an example of a schematic configuration of a radio communication apparatus according to a second example embodiment.

DESCRIPTION OF THE EXAMPLE EMBODIMENTS

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Related Art
2. Overview of Example Embodiments of the Present Invention
3. First Example Embodiment
    3.1. Configuration of System
    3.2. Configuration of Base Station
    3.3. Configuration of Terminal Apparatus
    3.4. Technical Features
    3.5. Example Alteration
4. Second Example Embodiment
    4.1. Configuration of Radio Communication Apparatus
    4.2. Technical Features 1. Related Art As techniques related to example embodiments of the present invention, DFT-S-OFDM and OFDM will be described.

(1) DFT-S-OFDM

Figure 1:
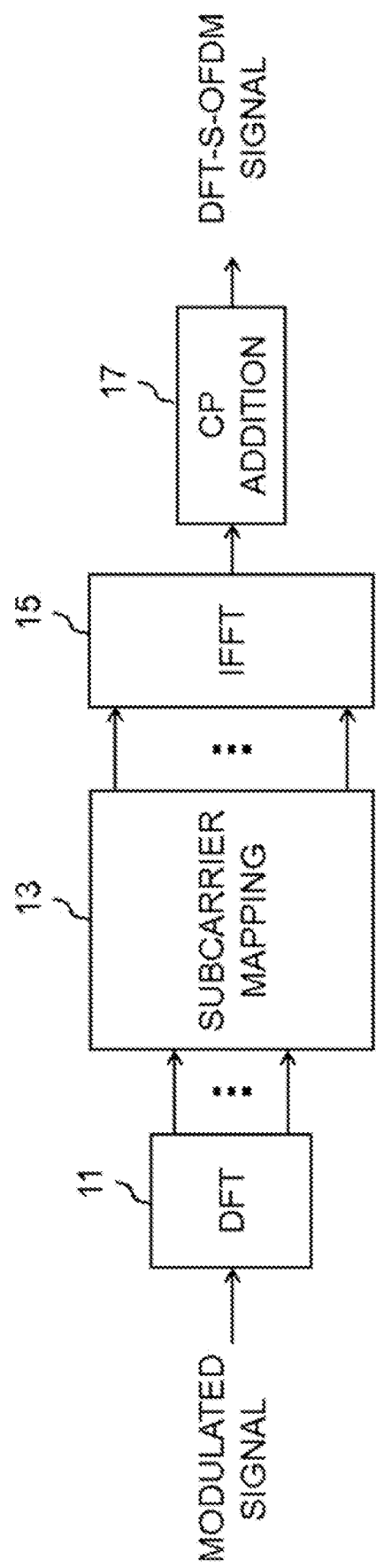
FIG. 1 is a block diagram of signal generation in DFT-S-OFDM.

FIG. 1 is a block diagram of signal generation in DFT-S-OFDM. With reference to FIG. 1, discrete Fourier transform (DFT) (11), subcarrier mapping (13), inverse fast Fourier transform (IFFT) (15), and cyclic prefix (CP) addition (17) are performed on a modulated signal.

In DFT-S-OFDM, mapping of a DFT output to an IFFT input is limited to subcarriers that are contiguous on a frequency axis, to generate a single-carrier signal having a low peak power, which enables wide coverage.

(2) OFDM

Figure 2:
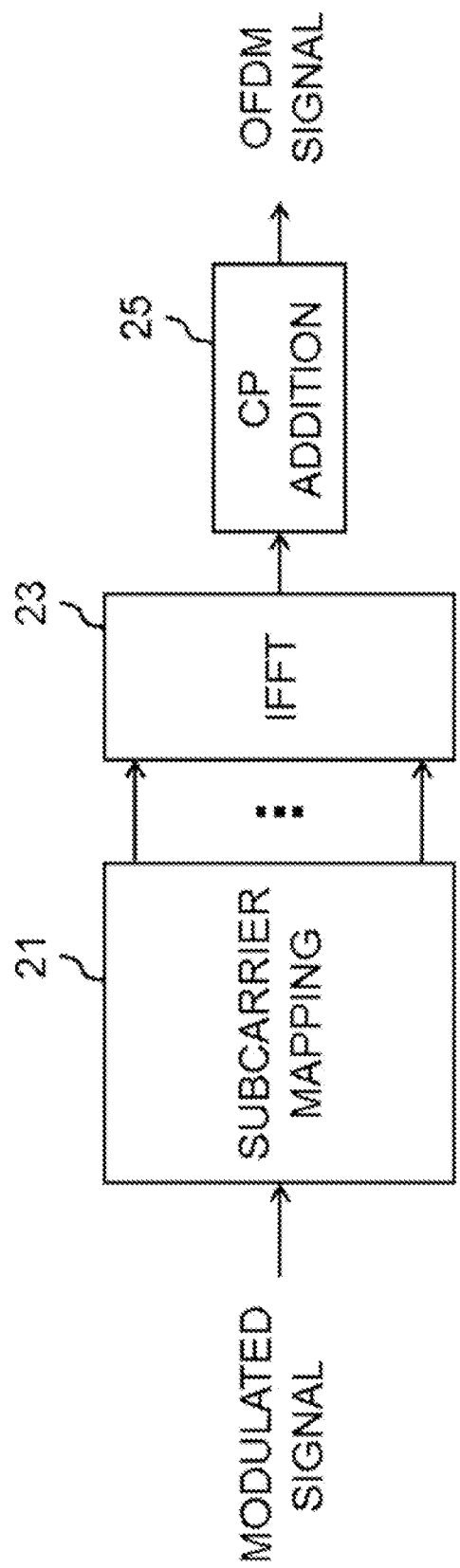
FIG. 2 is a block diagram of signal generation in OFDM.

FIG. 2 is a block diagram of signal generation in OFDM. With reference to FIG. 2, subcarrier mapping (21), inverse fast Fourier transform (IFFT) (23), and cyclic prefix (CP) addition (25) are performed on a modulated signal.

OFDM is a multi-carrier transmission scheme and is highly flexible with respect to radio resource allocation since radio resources that are discontiguous on a frequency axis are allocated. However, a peak power in this scheme is higher than that in a single-carrier transmission scheme, and hence the coverage results in being small.

2. Overview of Example Embodiments of the Present Invention

First, an overview of example embodiments of the present invention will be described.

(1) Technical Issues

In 3GPP, DFT-S-OFDM as well as OFDM are adopted as radio transmission schemes to be used for uplink data transmission and reception in NR, for coverage expansion. Since OFDM and DFT-S-OFDM are both thus adopted as radio transmission schemes, OFDM transmission and DFT-S-OFDM transmission may coexist within the same transmission time interval. When such radio transmission schemes coexist without any restriction, control related to radio communication may be difficult or inefficient.

As an example, if each base station allows mixture of OFDM transmission and DFT-S-OFDM transmission with less restriction, interference control or coordinated multi-point transmission/reception (CoMP) between base stations may be difficult.

Figure 3:
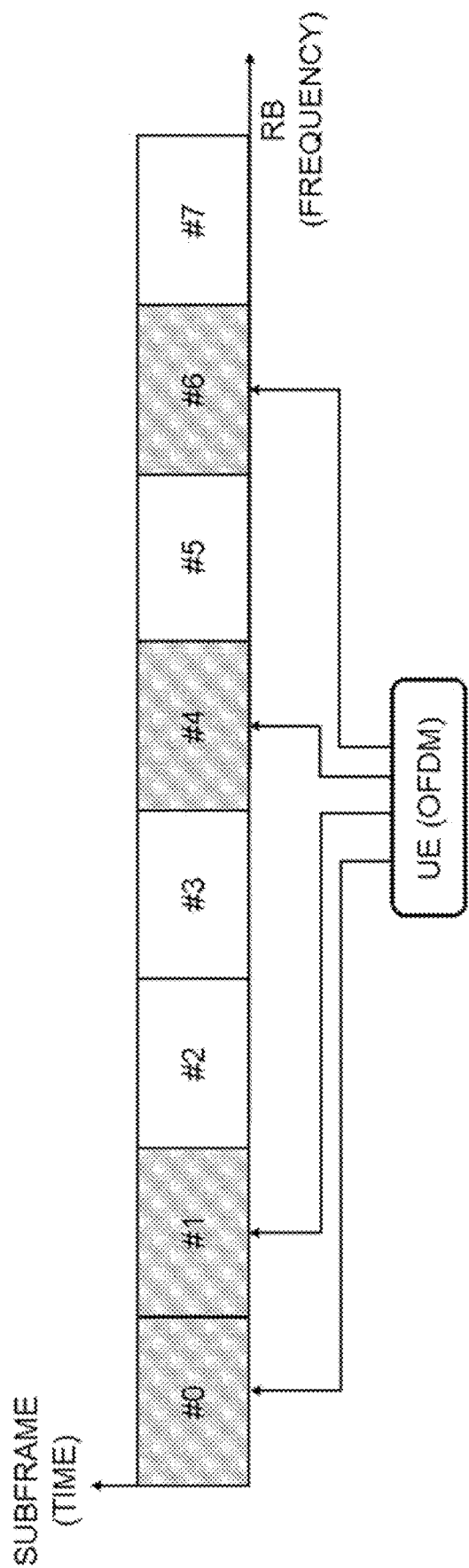
FIG. 3 is an explanatory diagram for illustrating an example of resource block allocation.

As a different example, radio resources that are discrete on a frequency axis are allocated for transmission in OFDM, which is a multi-carrier transmission scheme, so that small discrete radio resources remain, which may consequently disable allocation of sufficient radio resources for transmission in DFT-S-OFDM, which is a single-carrier transmission scheme. In other words, allocation of radio resources for DFT-S-OFDM transmission may be limited. Specifically, for example, as illustrated in FIG. 3, resource block (RB) #0, RB #1, RB #4, and RB #6 are allocated for a UE employing OFDM, and RB #2, RB #3, RB #5, and RB #7 remain. Here, a UE employing DFT-S-OFDM has a restriction that only RBs that are contiguous on a frequency axis are allocable, and hence only two RBs, RB #2 and RB #3, are allocated for this UE at maximum. In this way, allocation of radio resources for DFT-S-OFDM transmission may be limited.

As a still different example, when DFT-S-OFDM transmission is performed in a limited manner, the information amount of resource allocation information is maintained if no restriction is imposed on radio resources to be allocated for DFT-S-OFDM, and this may cause signaling to be inefficient.

Hence, it is desirable to perform control related to radio communication more appropriately when radio transmission schemes coexist.

(2) Technical Features

In the example embodiments of the present invention, for example, a radio communication apparatus (a base station/a terminal apparatus) performs communication using a first radio transmission scheme (e.g., OFDM) within a frequency band. Moreover, the radio communication apparatus (the base station or the terminal apparatus) performs communication using a second radio transmission scheme (e.g., DFT-S-OFDM) within a bandwidth part of the frequency band, radio resources within the bandwidth part being allocable for communication using the second radio transmission scheme.

With this, it is possible, for example, to perform control related to radio communication more appropriately when radio transmission schemes coexist.

Note that the above-described technical features are concrete examples of the example embodiments of the present invention, and the present example embodiments of the present invention are, of course, not limited to the above-described technical features.

3. First Example Embodiment

Next, a description will be given of a first example embodiment of the present invention with reference to FIGS. 4 to 14.

3.1. Configuration of System

Figure 4:
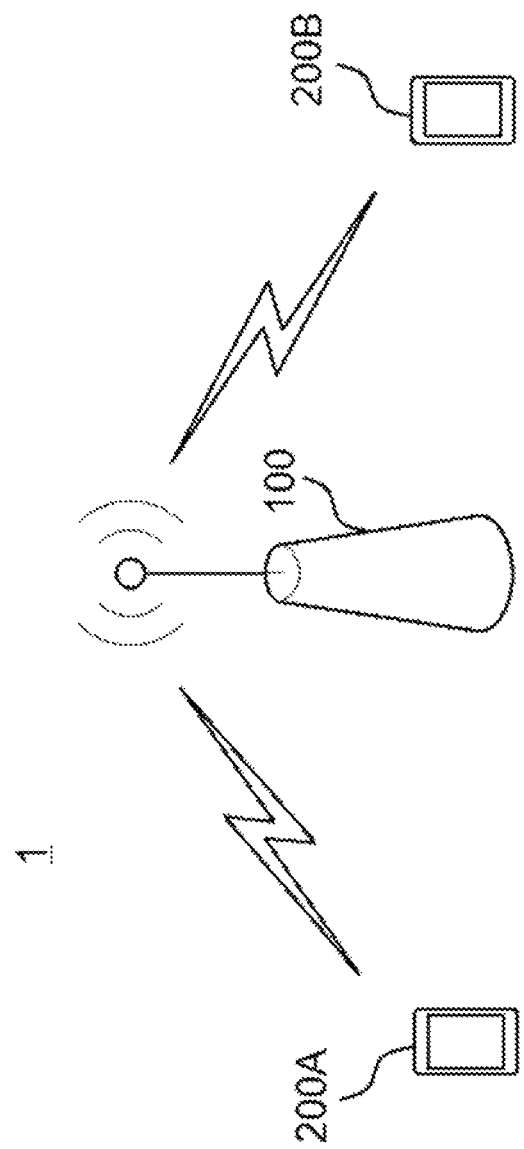
FIG. 4 is an explanatory diagram illustrating an example of a schematic configuration of a system according to a first example embodiment.

First, with reference to FIG. 4, an example of a configuration of a system 1 according to the first example embodiment will be described. FIG. 4 is an explanatory diagram illustrating an example of a schematic configuration of the system 1 according to the first example embodiment. With reference to FIG. 4, the system 1 includes a base station 100 and terminal apparatuses 200.

Although two terminal apparatuses 200 (a terminal apparatus 200A and a terminal apparatus 200B) are illustrated in FIG. 4, the system 1 may include three or more terminal apparatuses 200. Here, when the two terminal apparatuses 200 need to be distinguished from each other, the terminal apparatuses 200 are described as the terminal apparatus 200A and the terminal apparatus 200B. However, when the two terminal apparatuses 200 need not be distinguished from each other, the terminal apparatuses 200 are simply described as the terminal apparatus(es) 200.

The system 1 is, for example, a system conforming to Third Generation Partnership Project (3GPP) standards/specifications. More specifically, for example, the system 1 may be a system conforming to fifth-generation (5G)/New Radio (NR) standards/specifications. The system 1 is, of course, not limited to these examples.

(1) Base Station 100

The base station 100 is a radio access network (RAN) node and is configured to perform radio communication with terminal apparatuses (e.g., the terminal apparatuses 200) located in the coverage area of the base station 100.

For example, the base station 100 may be a generation Node B (gNB) in 5G. The base station 100 may include a plurality of units (or a plurality of nodes). The plurality of units (or the plurality of nodes) may include a first unit (or a first node) configured to perform higher protocol layer processing and a second unit (or a second node) configured to perform lower protocol layer processing. As an example, the first unit may be referred to as a center/central unit (CU), and the second unit may be referred to as a distributed unit (DU) or an access unit (AU). As another example, the first unit may be referred to as a digital unit (DU), and the second unit may be referred to as a radio unit (RU) or a remote unit (RU). The digital unit (DU) may be a base band unit (BBU), and the RU may be a remote radio head (RRH) or a remote radio unit (RRU). The terms for the first unit (or the first node) and the second unit (or the second node) are, of course, not limited to these examples. Alternatively, the base station 100 may be a single unit (or a single node). In this case, the base station 100 may be one of the plurality of units (e.g., either one of the first unit and the second unit) or may be connected to another unit of the plurality of units (e.g., the other one of the first unit and the second unit).

(2) Terminal Apparatus 200

Each terminal apparatus 200 performs radio communication with a base station. For example, the terminal apparatus 200 performs radio communication with the base station 100 in a case of being located in the coverage area of the base station 100. For example, the terminal apparatus 200 is a user equipment (UE).

3.2. Configuration of Base Station

Figure 5:
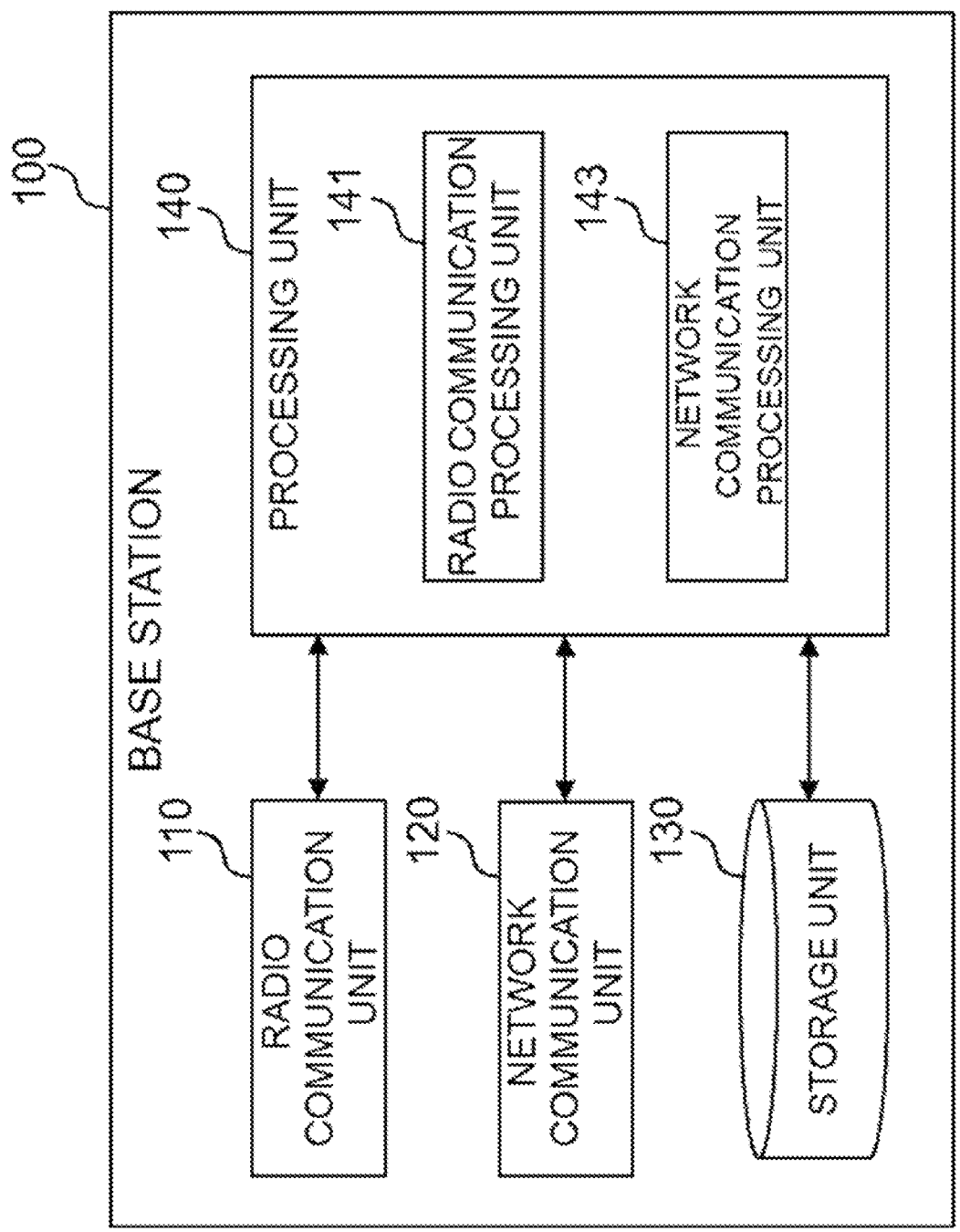
FIG. 5 is a block diagram illustrating an example of a schematic configuration of a base station according to the first example embodiment.

Next, with reference to FIG. 5, a description will be given of an example of a configuration of the base station 100 according to the first example embodiment. FIG. 5 is a block diagram illustrating an example of a schematic configuration of the base station 100 according to the first example embodiment. With reference to FIG. 5, the base station 100 includes a radio communication unit 110, a network communication unit 120, a storage unit 130, and a processing unit 140.

(1) Radio Communication Unit 110

The radio communication unit 110 wirelessly transmits and/or receives a signal. For example, the radio communication unit 110 receives a signal from a terminal apparatus and transmits a signal to the terminal apparatus.

(2) Network Communication Unit 120

The network communication unit 120 receives a signal from a network and transmits a signal to the network.

(3) Storage Unit 130

The storage unit 130 temporarily or permanently stores programs (instructions) and parameters for operations of the base station 100 as well as various data. The program includes one or more instructions for operations of the base station 100.

(4) Processing Unit 140

The processing unit 140 provides various functions of the base station 100. The processing unit 140 includes a radio communication processing unit 141 and a network communication processing unit 143. Note that the processing unit 140 may further include constituent elements other than these constituent elements. In other words, the processing unit 140 may also perform operations other than the operations of these constituent elements. Concrete operations of the radio communication processing unit 141 and the network communication processing unit 143 will be described later in detail.

For example, the processing unit 140 (the radio communication processing unit 141) communicates with a terminal apparatus (e.g., the terminal apparatus 200) via the radio communication unit 110. For example, the processing unit 140 (the network communication processing unit 143) communicates with a different network node (e.g., a different base station or core network node) via the network communication unit 120.

(5) Implementation Example

The radio communication unit 110 may be implemented with an antenna, a radio frequency (RF) circuit, and the like, and the antenna may be a directional antenna. The network communication unit 120 may be implemented with a network adapter and/or a network interface card, and the like. The storage unit 130 may be implemented with a memory (e.g., a nonvolatile memory and/or a volatile memory) and/or a hard disk, and the like. The processing unit 140 may be implemented with one or more processors, such as a baseband (BB) processor and/or a different kind of processor. The radio communication processing unit 141 and the network communication processing unit 143 may be implemented with the same processor or may be implemented with separate processors. The memory (storage unit 130) may be included in the one or more processors or may be provided outside the one or more processors.

The base station 100 may include a memory configured to store a program (instructions) and one or more processors that can execute the program (instructions). The one or more processors may execute the program and thereby perform operations of the processing unit 140 (operations of the radio communication processing unit 141 and the network communication processing unit 143). The program may be a program for causing the processor(s) to perform operations of the processing unit 140 (operations of the radio communication processing unit 141 and the network communication processing unit 143).

Note that the base station 100 may be virtual. In other words, the base station 100 may be implemented as a virtual machine. In this case, the base station 100 (the virtual machine) may operate as a physical machine (hardware) including a processor, a memory, and the like, and a virtual machine on a hypervisor.

3.3. Configuration of Terminal Apparatus

Figure 6:
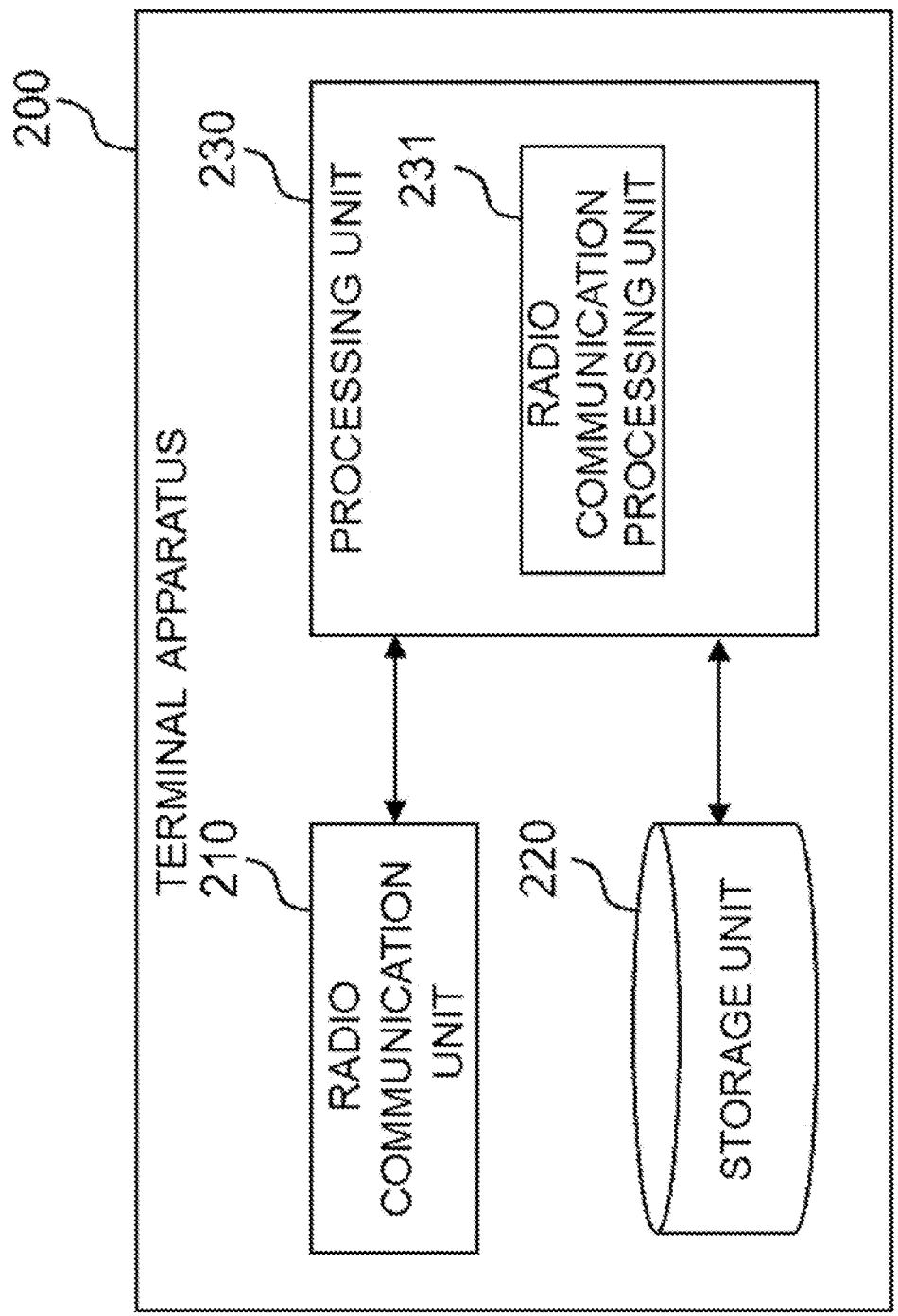
FIG. 6 is a block diagram illustrating an example of a schematic configuration of a terminal apparatus according to the first example embodiment.

Next, with reference to FIG. 6, an example of a configuration of the terminal apparatus 200 according to the first example embodiment will be described. FIG. 6 is a block diagram illustrating an example of a schematic configuration of the terminal apparatus 200 according to the first example embodiment. With reference to FIG. 6, the terminal apparatus 200 includes a radio communication unit 210, a storage unit 220, and a processing unit 230.

(1) Radio Communication Unit 210

The radio communication unit 210 wirelessly transmits and/or receives a signal. For example, the radio communication unit 210 receives a signal from a base station and transmits a signal to the base station.

(2) Storage Unit 220

The storage unit 220 temporarily or permanently stores programs (instructions) and parameters for operations of the terminal apparatus 200 as well as various data. The program includes one or more instructions for the operations of the terminal apparatus 200.

(3) Processing Unit 230

The processing unit 230 provides various functions of the terminal apparatus 200. The processing unit 230 includes a radio communication processing unit 231. Note that the processing unit 230 may further include constituent elements other than this constituent element. In other words, the processing unit 230 may also perform operations other than the operations of this constituent element. Concrete operations of the radio communication processing unit 231 will be described later in detail.

For example, the processing unit 230 (the radio communication processing unit 231) communicates with a base station (e.g., the base station 100) via the radio communication unit 210.

(4) Implementation Example

The radio communication unit 210 may be implemented with an antenna, a radio frequency (RF) circuit, and the like. The storage unit 220 may be implemented with a memory (e.g., a nonvolatile memory and/or a volatile memory) and/or a hard disk, and the like. The processing unit 230 may be implemented with one or more processors, such as a baseband (BB) processor and/or a different kind of processor. The memory (storage unit 220) may be included in the one or more processors or may be provided outside the one or more processors. As an example, the processing unit 230 may be implemented in a system on chip (SoC).

The terminal apparatus 200 may include a memory configured to store a program (instructions) and one or more processors that can execute the program (instructions). The one or more processors may execute the program and thereby perform operations of the processing unit 230 (operations of the radio communication processing unit 231). The program may be a program for causing the processor(s) to perform operations of the processing unit 230 (operations of the radio communication processing unit 231).

3.4. Technical Features

Next, technical features of the first example embodiment will be described with reference to FIGS. 7 to 13.

The base station 100 (the radio communication processing unit 141) performs communication using a first radio transmission scheme, within a frequency band. Moreover, the base station 100 (the radio communication processing unit 141) performs communication using a second radio transmission scheme within a bandwidth part of the frequency band, radio resources within the bandwidth part being allocable for communication using the second radio transmission scheme.

The terminal apparatus 200 (the radio communication processing unit 231) performs communication using the first radio transmission scheme, within the frequency band. Moreover, the terminal apparatus 200 (the radio communication processing unit 231) performs communication using the second radio transmission scheme, within the bandwidth part.

(1) Radio Transmission Scheme

For example, the first radio transmission scheme is a multi-carrier transmission scheme, and the second radio transmission scheme is a single-carrier transmission scheme.

In other words, for example, the first radio transmission scheme is a first multiplexing scheme, and the second radio transmission scheme is a second multiplexing scheme.

More specifically, for example, the first radio transmission scheme is OFDM, and the second radio transmission scheme is DFT-S-OFDM.

(2) Communication

For example, the communication using the first radio transmission scheme and the communication using the second radio transmission scheme are each communication of data channel.

For example, the communication using the first radio transmission scheme and the communication using the second radio transmission scheme are each uplink communication. In this case, for example, the data channel is a physical uplink shared channel (PUSCH).

(3) Frequency Band

For example, the frequency band is a frequency band of a cellular system (or a mobile communication system). For example, the frequency band is a system band or a component carrier of a cellular system.

(4) Bandwidth Part

For example, the bandwidth part has a bandwidth equal to or wider than two resource blocks. In other words, the bandwidth part includes two or more contiguous resource blocks. The bandwidth part may have a bandwidth of six resource blocks. In this case, the bandwidth part may be referred to as a narrow band.

For example, the bandwidth part is a band within which radio resources are not allocable for communication of the first radio transmission scheme. In other words, the base station 100 (the radio communication processing unit 141) and the terminal apparatus 200 (the radio communication processing unit 231) perform communication using the first radio transmission scheme within a region of the frequency band outside the bandwidth part and do not perform communication using the first radio transmission scheme within the bandwidth part.

Figure 7:
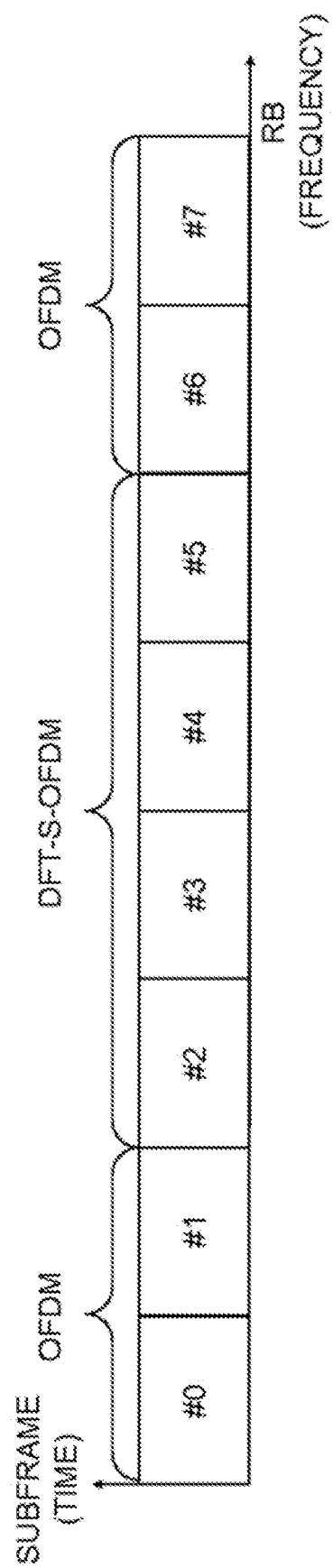
FIG. 7 is an explanatory diagram for illustrating an example of a bandwidth part according to the first example embodiment.
Figure 8:
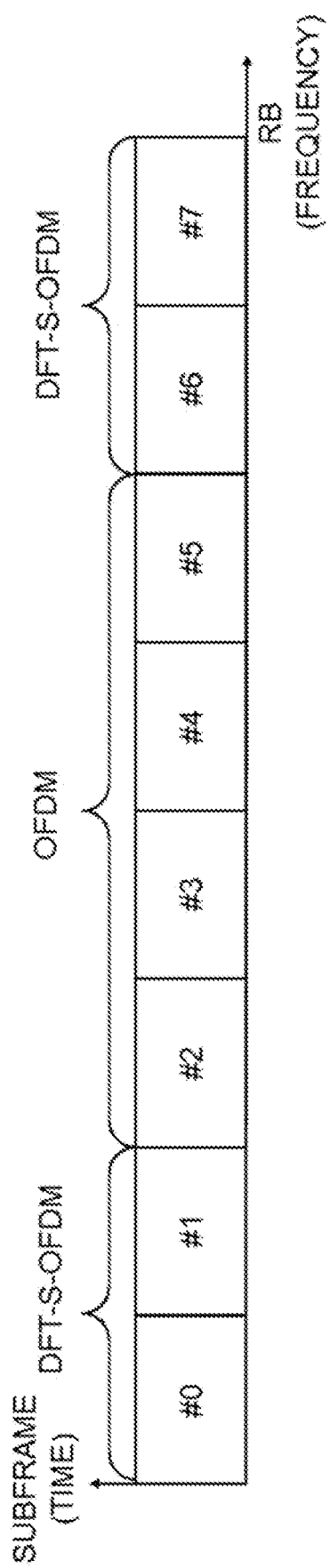
FIG. 8 is an explanatory diagram for illustrating a different example of the bandwidth part according to the first example embodiment.
Figure 9:
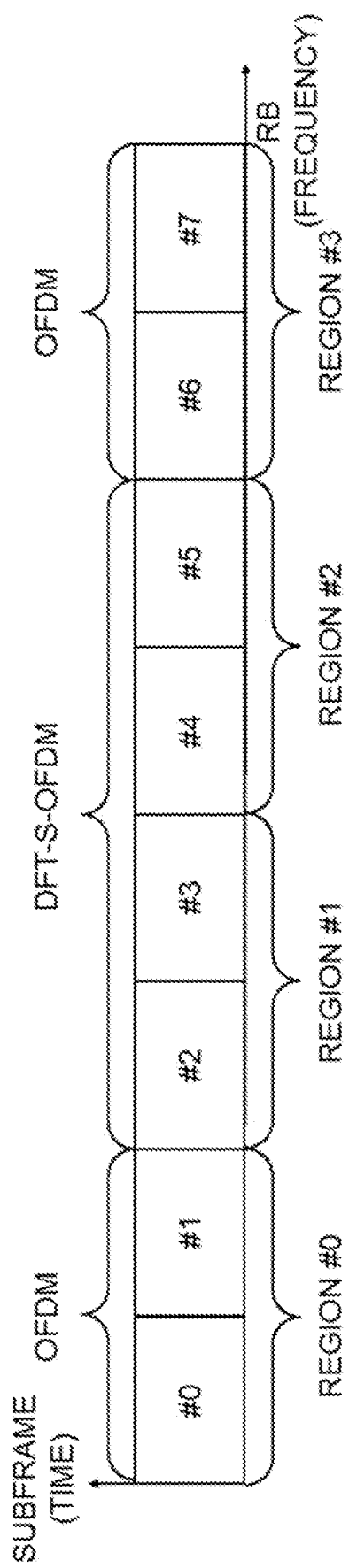
FIG. 9 is an explanatory diagram illustrating an example of identification information of regions according to the first example embodiment.

FIG. 7 is an explanatory diagram for illustrating an example of a bandwidth part according to the first example embodiment. With reference to FIG. 7, a frequency band including eight resource blocks (RBs #0 to #7) is illustrated. In this example, a band including RBs #2 to #5 is designated as a bandwidth part, radio resources within the bandwidth part being allocable for communication using DFT-S-OFDM. In other words, in this example, the base station 100 performs communication using DFT-S-OFDM within the bandwidth part including RBs #2 to #5. The terminal apparatus 200 also performs communication using DFT-S-OFDM within the bandwidth part. In this case, radio resources within a band including RBs #0 and #1 and a band including RBs #6 and #7 are allocable for communication using OFDM. In other words, in this example, the base station 100 performs communication using OFDM within the band including RBs #0 and #1 and the band including RBs #6 and #7. The terminal apparatus 200 also performs communication using OFDM in these bands. As an example, in a certain subframe, the terminal apparatus 200A performs communication using DFT-S-OFDM within the bandwidth part (RBs #2 to #5), while the terminal apparatus 200B performs communication using OFDM in different regions (RBs #0, #1, #6, and #7).

According to this example, four RBs are allocable for a terminal apparatus using DFT-S-OFDM at maximum. In this way, it may be possible to avoid a situation where allocation of sufficient radio resources for transmission of the second radio transmission scheme (DFT-S-OFDM) is not possible due to communication of the first radio transmission scheme (OFDM).

Note that a plurality of bandwidth parts, radio resources within the bandwidth parts being allocable for communication using the second radio transmission scheme (e.g., DFT-S-OFDM), may be designated. For example, as in an example illustrated in FIG. 8, a band including RBs #0 and #1 and a band including RBs #6 and #7 may be designated as two bandwidth parts, radio resources within the bandwidth parts being allocable for communication using DFT-S-OFDM.

The bandwidth part may have a bandwidth greater than 1.4 MHz (instead of equal to or wider than two resource blocks).

As described above, the bandwidth part is a band of the frequency band, radio resources within the band being allocable for communication using the second radio transmission scheme, and may, in other words, be considered as a band reserved for communication using the second radio transmission scheme. The bandwidth part may be referred to as other terms such as a "frequency region" or a "radio resource region" (without being limited thereto).

(5) Transmission of Control Information to Terminal Apparatus (5-1) Bandwidth Part For example, the base station 100 (the radio communication processing unit 141) transmits first control information indicating the bandwidth part, to the terminal apparatus 200. The terminal apparatus 200 (the radio communication processing unit 231) then receives the first control information from the base station 100.

Specifically, for example, the base station 100 (the radio communication processing unit 141) transmits a radio resource control (RRC) message including the first control information, to the terminal apparatus 200. The terminal apparatus 200 (the radio communication processing unit 231) then receives the RRC message. The RRC message may be system information or a dedicated message.

Alternatively, the base station 100 (the radio communication processing unit 141) may transmit a medium access control (MAC) control element including the first control information, to the terminal apparatus 200. The terminal apparatus 200 (the radio communication processing unit 231) may then receive the MAC control element.

In this way, for example, the terminal apparatus 200 can be notified of the bandwidth part. Moreover, as will be described later, it is possible to reduce the overhead of resource allocation information, for example. Moreover, it is possible, for example, to change the bandwidth part.

As an example, the first control information includes identification information of the first RB among the RBs included in the bandwidth part (#2 in the example in FIG. 7) and information indicating the number of RBs included in the bandwidth part (four in the example in FIG. 7).

As a different example, identification information may be given to a region consisting of a plurality of RBs, and the first control information may include identification information of the region(s) included in the bandwidth part. For example, as in an example illustrated in FIG. 9, #0 may be given as identification information to a region consisting of RB #0 and RB #1; #1 may be given as identification information to a region consisting of RB #2 and RB #3; #2 may be given as identification information to a region consisting of RB #4 and RB #5; and #3 may be given as identification information to a region consisting of RB #6 and RB #7. In this case, the first control information may include #1 and #2 (pieces of identification information of the regions included in the bandwidth part). Alternatively, the first control information may include identification information (#1) of the first region included in the bandwidth part and information (two) indicating the number of regions included in the bandwidth part.

(5-2) Radio Transmission Scheme

For example, the base station 100 (the radio communication processing unit 141) transmits, to the terminal apparatus 200, second control information indicating which of the first radio transmission scheme and the second radio transmission scheme is to be used. The terminal apparatus 200 (the radio communication processing unit 231) then receives the second control information from the base station 100.

Specifically, for example, the base station 100 (the radio communication processing unit 141) transmits downlink control information (DCI) including the second control information, to the terminal apparatus 200. Alternatively, the base station 100 (the radio communication processing unit 141) may transmit a MAC control element including the second control information, to the terminal apparatus 200.

For example, the second control information is 1-bit information, and indicates, when indicating 0, to use the first radio transmission scheme while indicating, when indicating 1, to use the second radio transmission scheme. Alternatively, the second control information may indicate, when indicating 0, to use the second radio transmission scheme while indicating, when indicating 1, to use the first radio transmission scheme.

This makes it possible, for example, to use a more preferable one of the first radio transmission scheme and the second radio transmission scheme. Using DCI makes it possible to dynamically switch the radio transmission scheme for each subframe. This switching may be performed for each symbol or slot.

(5-3) Radio Resources

For example, the base station 100 (the radio communication processing unit 141) transmits, to the terminal apparatus 200, resource allocation information indicating radio resources allocated for the terminal apparatus 200. More specifically, for example, the base station 100 (the radio communication processing unit 141) transmits DCI including the resource allocation information, to the terminal apparatus 200.

For example, the radio resources within the bandwidth part has local identification information for locally identifying the radio resources within the bandwidth part. In this case, the base station 100 (the radio communication processing unit 141) transmits the local identification information as the resource allocation information, to the terminal apparatus 200. The terminal apparatus 200 (the radio communication processing unit 231) receives the local identification information as the resource allocation information, from the base station 100.

Moreover, the radio resources within a region in the frequency band outside the bandwidth part may also have different local identification information for locally identifying the radio resources within the region. In this case, the base station 100 (the radio communication processing unit 141) may transmit the different local identification information as the resource allocation information, to the terminal apparatus 200. The terminal apparatus 200 (the radio communication processing unit 231) may receive the different local identification information as the resource allocation information, from the base station 100.

Figure 10:
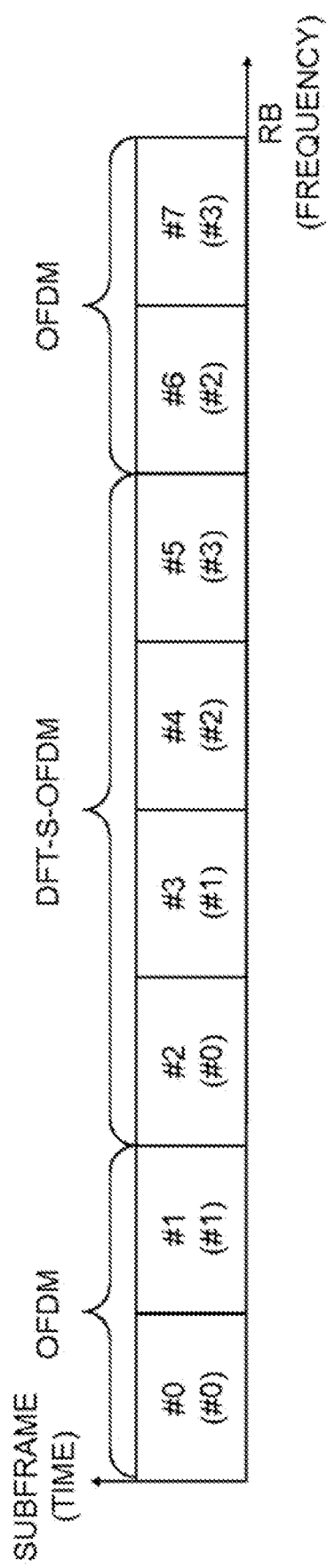
FIG. 10 is an explanatory diagram for illustrating an example of local identification information according to the first example embodiment.

FIG. 10 is an explanatory diagram for illustrating an example of local identification information according to the first example embodiment. With reference to FIG. 10, a frequency band including eight resource blocks (RBs #0 to #7) is illustrated as in the example in FIG. 7. Also in this example, as in the example in FIG. 7, a band including RBs #2 to #5 is a bandwidth part, radio resources within the bandwidth part being allocable for communication using DFT-S-OFDM. As indicated in parentheses, RBs #2 to #5 within the bandwidth part has respective pieces of local identification information #0 to #3. For example, as resource allocation information for the terminal apparatus 200A, local identification information of the first RB among allocated RBs and information indicating the number of allocated RBs (or local identification information of the last RB among the allocated RBs) are transmitted to the terminal apparatus 200A. Moreover, in this example, RBs #0, #1, #6, and #7 in the regions outside the bandwidth part also have

0 to #3, respectively, as pieces of different local identification information for locally identifying RBs #0, #1, #6, and #7 in the regions. For example, as resource allocation information for the terminal apparatus 200B, the different local identification information is transmitted to the terminal apparatus 200B. In this way, it may be possible to reduce the information amount of resource allocation information.

Figure 11:
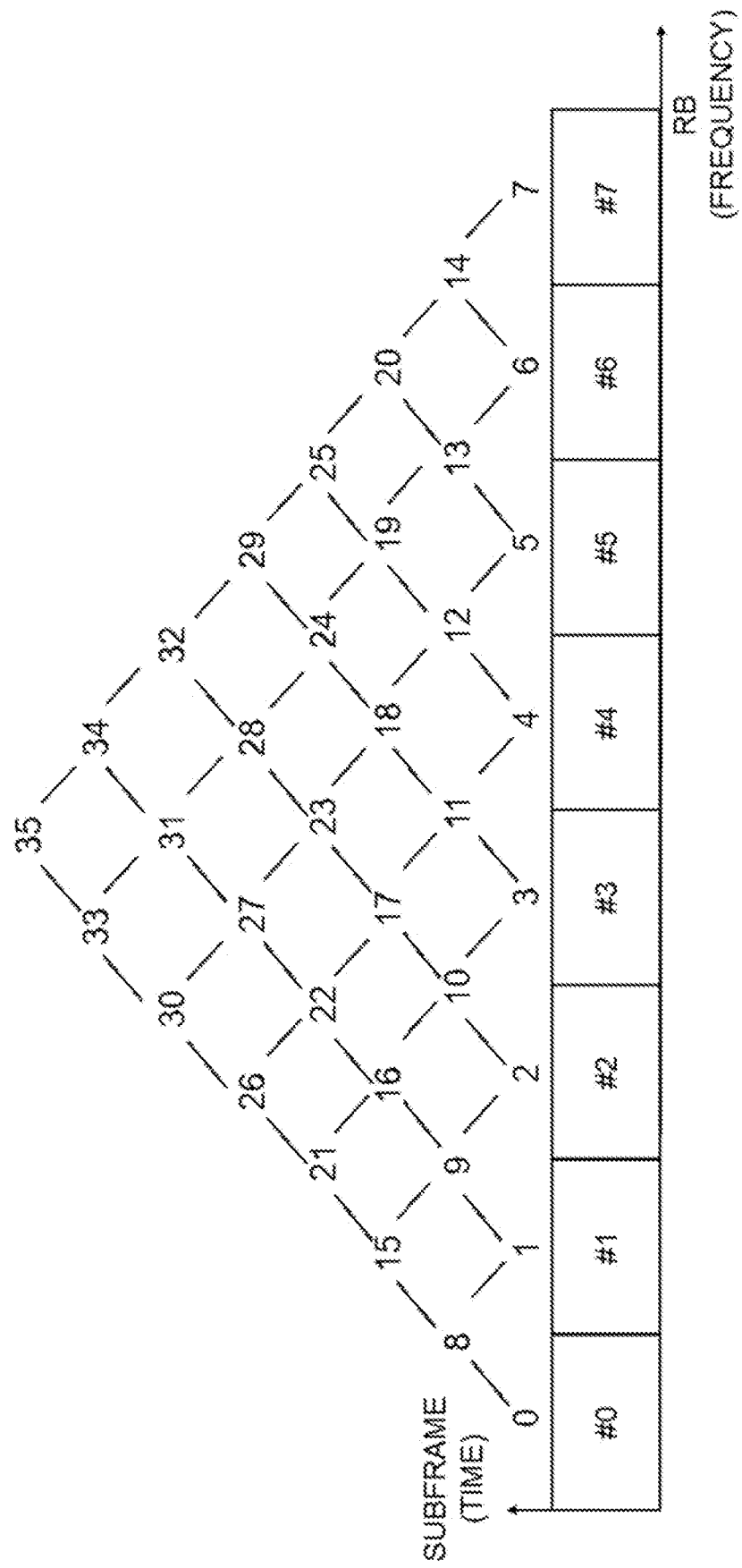
FIG. 11 is an explanatory diagram for illustrating an example of identification information of radio resources in a tree-based representation.
Figure 12:
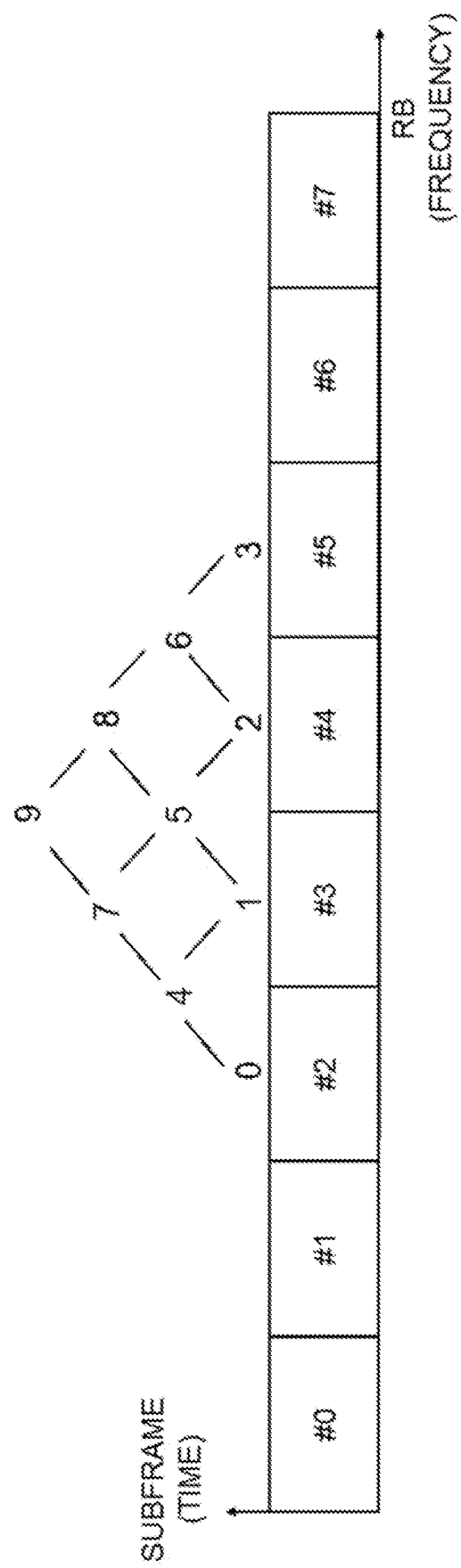
FIG. 12 is an explanatory diagram for illustrating a different example of local identification information according to the first example embodiment.

Note that the local identification information is not limited to information indicating each individual RB as described above. For example, the local identification information may be information indicating a combination of RBs. For example, as illustrated in FIG. 11, it is possible to identify, by using a tree-based representation, combinations of contiguous RBs among RBs #0 to #7 by using indices 0 to 35. In the case of using such a tree-based representation, for example, radio resources (a combination of contiguous RBs) within the bandwidth part (RBs #2 to #5) may have one of indices 0 to 9 as local identification information as illustrated in FIG. 12. In this way, for example, the information amount of the resource allocation information is reduced from six bits (for 0 to 35) to four bits (for 0 to 9).

As described above, it is possible, for example, to reduce the overhead of resource allocation information by using local identification information.

The DCI may be transmitted on a physical downlink control channel (PDCCH) or may be transmitted on a machine type communications PDCCH (MPDCCH).

For example, the format of DCI may be Format 6-0A, 6-0B, 6-1A, 6-1B, or 6-2. In this case, DCI may include a repetition number for a PDSCH or a PUSCH.

When DCI includes a repetition number, a system may be configured so as to dynamically switch at least one of the first control information and the second control information every subframes corresponding to the repetition number. Moreover, DCI may include control information indicating that at least one of the first control information and the second control information is dynamically switched every subframes corresponding to the repetition number. Note that at least one of the first control information and the second control information may be different among subframes in which the at least one of the first control information and the second control information is repeatedly transmitted, and control information indicating this may be included in DCI.

(6) Transmission of Control Information to Different Base Station

For example, the base station 100 (the network communication processing unit 143) transmits third control information indicating the bandwidth part, to a different base station.

More specifically, for example, the base station 100 (the network communication processing unit 143) transmits a message including the third control information, to the different base station through an Xn interface. The message may further include different kinds of information indicating the term of validity and the like of the third control information. The message may be a message for interference control or CoMP.

With this, for example, it is possible to perform interference control or CoMP more appropriately between base stations even when two radio transmission schemes coexist.

(7) Measurements

As described above, for example, the communication using the first radio transmission scheme and the communication using the second radio transmission scheme are each uplink communication.

For example, the terminal apparatus 200 (the radio communication processing unit 231) transmits uplink reference signals for measurements within the bandwidth part and does not transmit the uplink reference signals outside the bandwidth part, when performing uplink communication using the second radio transmission scheme within the bandwidth part. In other words, transmission of uplink reference signals is restricted to be performed within the bandwidth part (e.g., RBs #2 to #5). For example, the measurements are measurements of channel quality by the base station 100. With this, it is possible, for example, to improve accuracy in measurements of channel quality by the base station 100.

(8) Flow of Processing

Figure 13:
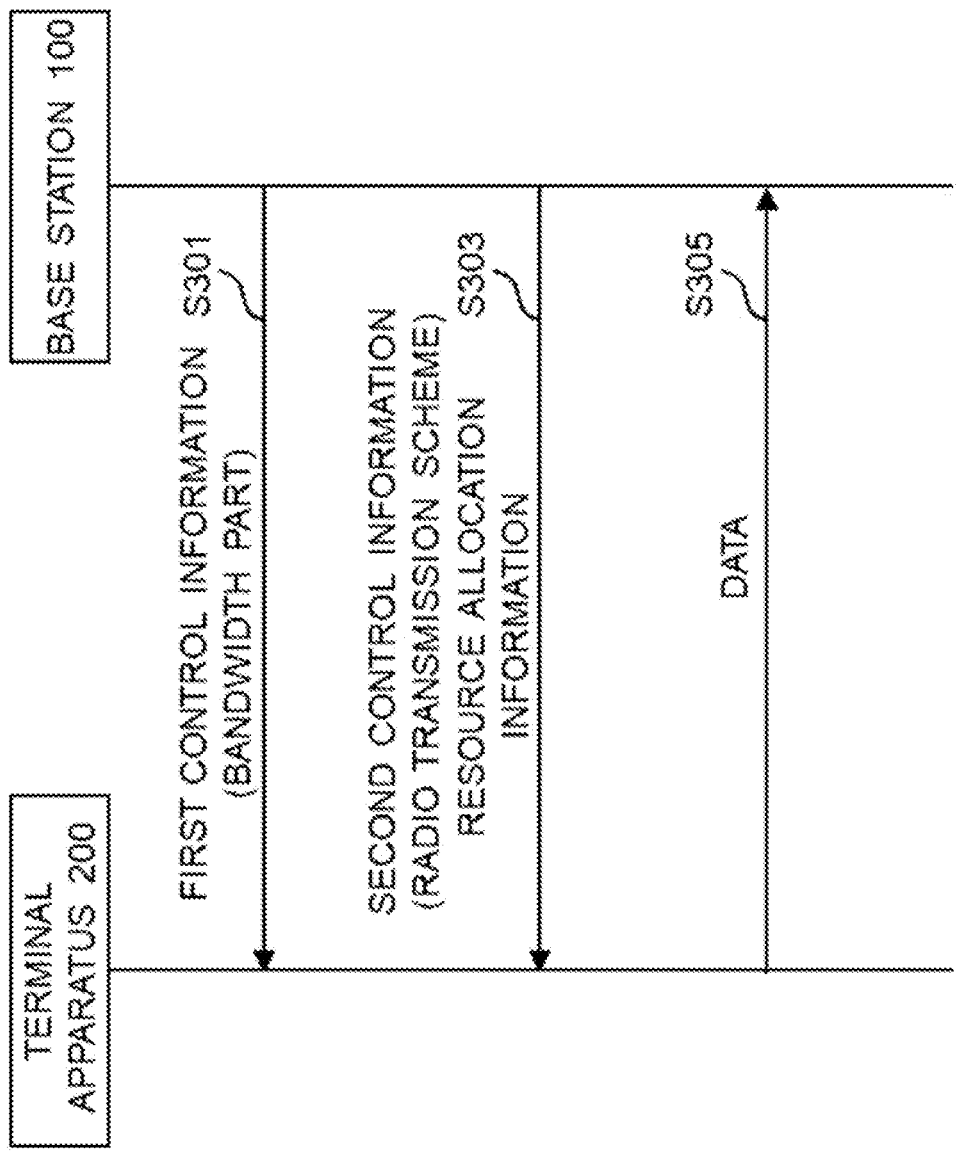
FIG. 13 is a sequence diagram for illustrating an example of a schematic flow of communication processing according to the first example embodiment.

With reference to FIG. 13, a description will be given of an example of communication processing according to the first example embodiment. FIG. 13 is a sequence diagram for illustrating an example of a schematic flow of communication processing according to the first example embodiment.

The base station 100 transmits first control information indicating a bandwidth part, to the terminal apparatus 200 (S301). The terminal apparatus 200 receives the first control information from the base station 100. For example, the base station 100 transmits an RRC message (or a MAC control element) including the first control information.

The base station 100 transmits, to the terminal apparatus 200, second control information indicating which of the first radio transmission scheme and the second radio transmission scheme is used and the resource allocation information (S303). The terminal apparatus 200 receives the second control information and the resource allocation information from the base station 100. For example, the base station 100 transmits DCI including the second control information and the resource allocation information.

The terminal apparatus 200 transmits data to the base station 100, based on the first control information, the second control information, and the resource allocation information (S305). The base station 100 receives the data.

3.5. Example Alterations

Next, with reference to FIG. 14, example alterations of the first example embodiment will be described.

(1) First Example Alteration

As described above, for example, the bandwidth part is a band within which radio resources are not allocable for communication of the first radio transmission scheme. However, the first example embodiment is not limited to this example.

As a first example alteration of the first example embodiment, the bandwidth part may be a band within which radio resources are allocable also for communication of the first radio transmission scheme. In other words, the base station 100 (the radio communication processing unit 141) and the terminal apparatus 200 (the radio communication processing unit 231) may perform communication using the first radio transmission scheme also within the bandwidth part without being limited to within a region of the frequency band outside the bandwidth part. In this case, for example, the bandwidth part may be a band within which radio resources are allocated more preferentially for communication of the second radio transmission scheme than for communication of the first radio transmission scheme.

Figure 14:
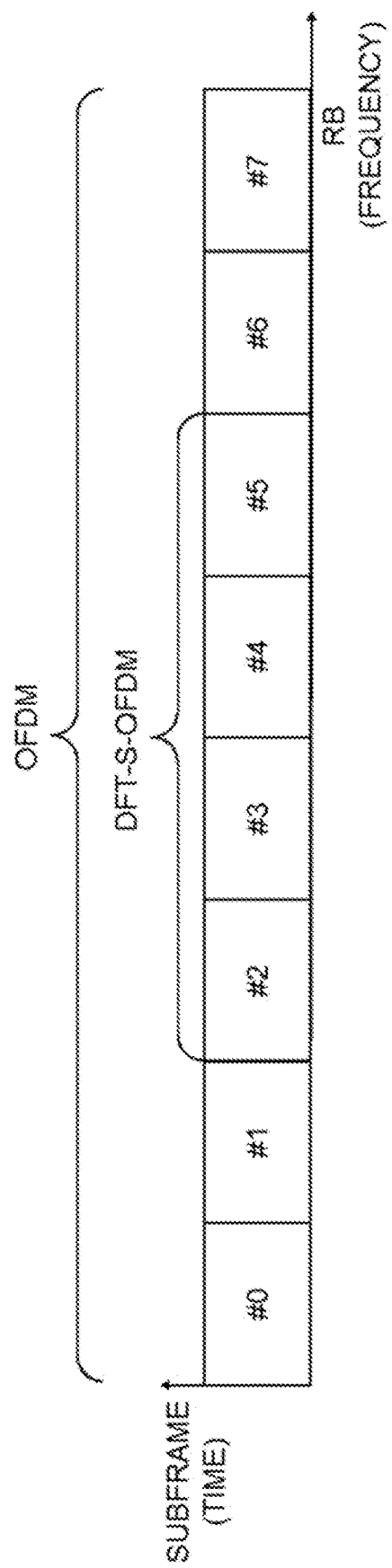
FIG. 14 is an explanatory diagram for illustrating an example of resource allocation according to a first example alteration of the first example embodiment.

FIG. 14 is an explanatory diagram for illustrating an example of resource allocation according to the first example alteration of the first example embodiment. With reference to FIG. 14, a frequency band including eight resource blocks (RBs #0 to #7) is illustrated as in the example in FIG. 7. Also in this example, as in the example in FIG. 7, a band including RBs #2 to #5 is a bandwidth part, radio resources within the bandwidth part being allocable for communication using DFT-S-OFDM. In particular, in the first example alteration, radio resources in all RBs #0 to #7, instead of only RBs #0, #1, #6, and #7, are allocable for communication using OFDM. However, RBs #2 to #5 are preferentially allocated for communication using DFT-S-OFDM.

With this, for example, it is possible to use radio resources while wasting less.

(2) Second Example Alteration

As described above, for example, the frequency band is a system band of a cellular system or a component carrier. However, the first example embodiment is not limited to this example.

As a second example alteration of the first example embodiment, the frequency band may be part of a system band or a component carrier. This part may be a band corresponding to the maximum transmission bandwidth (or the maximum reception bandwidth) of the terminal apparatus 200.

(3) Third Example Alteration

As described above, for example, the communication using the first radio transmission scheme and the communication using the second radio transmission scheme are each uplink communication. However, the first example embodiment is not limited to this example.

As a third example alteration of the first example embodiment, the communication using the first radio transmission scheme and the communication using the second radio transmission scheme may each be downlink communication.

In this case, for example, the terminal apparatus 200 (the radio communication processing unit 231) may measure channel quality for the bandwidth part and may not necessarily measure channel quality for the other band(s) of the frequency band. In other words, the band in which the terminal apparatus 200 performs measurements is restricted within the bandwidth part (e.g., RBs #2 to #5). The terminal apparatus 200 transmits a result of the measurements within the bandwidth part as feedback to the base station 100. With this, it is possible, for example, to reduce a computation amount for measurements by the terminal apparatus 200 and reduce the overhead of feedback with a measurement result.

The first example embodiment has been described above. According to the first example embodiment, it is possible, for example, to perform control related to radio communication more appropriately when radio transmission schemes coexist.

4. Second Example Embodiment

Next, a description will be given of a second example embodiment of the present invention with reference to FIG. 15. The above-described first example embodiment is a concrete example embodiment, whereas the second example embodiment is a more generalized example embodiment.

4.1. Configuration of Radio Communication Apparatus

First, with reference to FIG. 15, an example of a configuration of a radio communication apparatus 400 according to the second example embodiment will be described. FIG. 15 is a block diagram illustrating an example of a schematic configuration of the radio communication apparatus 400 according to the second example embodiment. With reference to FIG. 15, the radio communication apparatus 400 includes a radio communication processing unit 410.

Concrete operations of the radio communication processing unit 410 will be described later in detail.

The radio communication processing unit 410 may be implemented with one or more processors (such as a BB processor and/or a different kind of processor) and a memory. The memory may be included in the one or more processors or may be provided outside the one or more processors. As an example, the radio communication processing unit 410 may be implemented within a SoC.

The radio communication apparatus 400 may include a memory configured to store a program (instructions) and one or more processors that can execute the program (instructions). The one or more processors may execute the program and thereby perform operations of the radio communication processing unit 410. The program may be a program for causing the processor(s) to perform the operations of the radio communication processing unit 410.

The radio communication apparatus 400 may be virtual. In other words, the radio communication apparatus 400 may be implemented as a virtual machine. In this case, the radio communication apparatus 400 (virtual machine) may operate as a physical machine (hardware) including a processor, a memory, and the like, and a virtual machine on a hypervisor.

Note that the radio communication apparatus 400 may, of course, further include constituent elements other than the radio communication processing unit 410. For example, the radio communication apparatus 400, as in the first example embodiment, may further include a radio communication unit, a network communication unit (and a network communication processing unit) and/or a storage unit, and/or may further include other constituent elements.

4.2. Technical Features

Next, technical features of the second example embodiment will be described.

The radio communication apparatus 400 (the radio communication processing unit 410) performs communication using a first radio transmission scheme, within the frequency band. Moreover, the radio communication apparatus 400 (the radio communication processing unit 410) performs communication using a second radio transmission scheme within a bandwidth part of the frequency band, radio resources within the bandwidth part being allocable for communication using the second radio transmission scheme.

For example, the radio communication apparatus 400 is a base station. As an example, the radio communication apparatus 400 is the base station 100 according to the first example embodiment. The radio communication apparatus 400 may, of course, be a different base station.

Alternatively, the radio communication apparatus 400 may be a terminal apparatus. As an example, the radio communication apparatus 400 may be the terminal apparatus 200 according to the first example embodiment. The radio communication apparatus 400 may, of course, be a different terminal apparatus.

As an example, descriptions of radio transmission schemes, communication, a frequency band, a bandwidth part, transmission of control information to a terminal apparatus, transmission of control information to a different base station, measurements, and a flow of processing are the same as the descriptions in the first example embodiment. Hence, overlapping descriptions are omitted here. Note that, in this case, the radio communication processing unit 410 may operate similarly to the radio communication processing unit 141 or the radio communication processing unit 231 of the first example embodiment.

The second example embodiment is, of course, not limited to this example.

The second example embodiment has been described above. According to the second example embodiment, it is possible, for example, to perform control related to radio communication more appropriately when radio transmission schemes coexist.

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be carried out in time series in the order described in the corresponding sequence diagram. For example, the steps in the processing may be carried out in an order different from that described in the corresponding sequence diagram or may be carried out in parallel. Some of the steps in the processing may be deleted, or more steps may be added to the processing.

An apparatus including constituent elements (e.g., the radio communication processing unit and/or the network communication processing unit) of the base station described in the Specification (e.g., one or more apparatuses (or units) among a plurality of apparatuses (or units) constituting the base station or a module for one of the plurality of apparatuses (or units)) may be provided. An apparatus including the constituent elements (e.g., the radio communication processing unit) of the terminal apparatus described in the Specification (e.g., a module for the terminal apparatus) may be provided. Moreover, methods including processing of the constituent elements may be provided, and programs causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

Supplementary Note 1

A radio communication apparatus comprising:
a radio communication processing unit configured to perform communication using a first radio transmission scheme within a frequency band, wherein the radio communication processing unit is configured to perform communication using a second radio transmission scheme within a bandwidth part of the frequency band, radio resources within the bandwidth part being allocable for communication using the second radio transmission scheme.

Supplementary Note 2

The radio communication apparatus according to Supplementary Note 1, wherein
the first radio transmission scheme is a multi-carrier transmission scheme, and
the second radio transmission scheme is a single-carrier transmission scheme.

Supplementary Note 3

The radio communication apparatus according to Supplementary Note 1 or 2, wherein
the first radio transmission scheme is a first multiplexing scheme, and
the second radio transmission scheme is a second multiplexing scheme.

Supplementary Note 4

The radio communication apparatus according to any one of Supplementary Notes 1 to 3, wherein
the first radio transmission scheme is Orthogonal Frequency Division Multiplexing (OFDM), and
the second radio transmission scheme is Discrete Fourier Transform Spread Orthogonal Frequency Division Multiplexing (DFT-S-OFDM).

Supplementary Note 5

The radio communication apparatus according to any one of Supplementary Notes 1 to 4, wherein the bandwidth part is a band within which radio resources are not allocable for communication of the first radio transmission scheme.

Supplementary Note 6

The radio communication apparatus according to any one of Supplementary Notes 1 to 4, wherein the bandwidth part is a band within which radio resources are allocable for communication of the first radio transmission scheme.

Supplementary Note 7

The radio communication apparatus according to Supplementary Note 6, wherein the bandwidth part is a band within which radio resources are allocated more preferentially for communication of the second radio transmission scheme than for communication of the first radio transmission scheme.

Supplementary Note 8

The radio communication apparatus according to any one of Supplementary Notes 1 to 7, wherein the radio communication apparatus is a base station.

Supplementary Note 9

The radio communication apparatus according to Supplementary Note 8, wherein the radio communication processing unit is configured to transmit, to a terminal apparatus, first control information indicating the bandwidth part.

Supplementary Note 10

The radio communication apparatus according to Supplementary Note 9, wherein the radio communication processing unit is configured to transmit, to a terminal apparatus, a radio resource control (RRC) message or a medium access control (MAC) control element including the first control information.

Supplementary Note 11

The radio communication apparatus according to Supplementary Note 9 or 10, wherein
a radio resource within the bandwidth part has local identification information for locally identifying the radio resource within the bandwidth part, and
the radio communication processing unit is configured to transmit, to a terminal apparatus, the local identification information as resource allocation information.

Supplementary Note 12

The radio communication apparatus according to any one of Supplementary Notes 8 to 11, wherein the radio communication processing unit is configured to transmit, to a terminal apparatus, second control information indicating which of the first radio transmission scheme and the second radio transmission scheme is used.

Supplementary Note 13

The radio communication apparatus according to Supplementary Note 12, wherein the radio communication processing unit is configured to transmit, to a terminal apparatus, downlink control information (DCI) including the second control information.

Supplementary Note 14

The radio communication apparatus according to any one of Supplementary Notes 8 to 13, further comprising a network communication processing unit configured to transmit, to another base station, third control information indicating the bandwidth part.

Supplementary Note 15

The radio communication apparatus according to any one of Supplementary Notes 1 to 7, wherein the radio communication apparatus is a terminal apparatus.

Supplementary Note 16

The radio communication apparatus according to Supplementary Note 15, wherein the radio communication processing unit is configured to receive, from a base station, first control information indicating the bandwidth part.

Supplementary Note 17

The radio communication apparatus according to Supplementary Note 16, wherein
a radio resource within the bandwidth part has local identification information for locally identifying the radio resource within the bandwidth part, and
the radio communication processing unit is configured to receive, from a base station, the local identification information as resource allocation information.

Supplementary Note 18

The radio communication apparatus according to any one of Supplementary Notes 15 to 17, wherein the radio communication processing unit is configured to receive, from a base station, second control information indicating which of the first radio transmission scheme and the second radio transmission scheme is used.

Supplementary Note 19

The radio communication apparatus according to any one of Supplementary Notes 15 to 18, wherein
the communication using the first radio transmission scheme and the communication using the second radio transmission scheme are uplink communication, and
the radio communication processing unit is configured to transmit uplink reference signals for measurements within the bandwidth part and not to transmit the uplink reference signals outside the bandwidth part, when performing uplink communication using the second radio transmission scheme within the bandwidth part.

Supplementary Note 20

The radio communication apparatus according to any one of Supplementary Notes 15 to 18, wherein
the communication using the first radio transmission scheme and the communication using the second radio transmission scheme are downlink communication, and
the radio communication processing unit is configured to measure channel quality for the bandwidth part and not to measure channel quality for the other bands of the frequency band.

Supplementary Note 21

The radio communication apparatus according to any one of Supplementary Notes 1 to 18, wherein the communication using the first radio transmission scheme and the communication using the second radio transmission scheme are uplink communication.

Supplementary Note 22

The radio communication apparatus according to any one of Supplementary Notes 1 to 18, wherein the communication using the first radio transmission scheme and the communication using the second radio transmission scheme are downlink communication.

Supplementary Note 23

The radio communication apparatus according to any one of Supplementary Notes 1 to 22, wherein the communication using the first radio transmission scheme and the communication using the second radio transmission scheme are communication of data channel.

Supplementary Note 24

The radio communication apparatus according to any one of Supplementary Notes 1 to 23, wherein the bandwidth part has a bandwidth equal to or wider than two resource blocks.

Supplementary Note 25

The radio communication apparatus according to any one of Supplementary Notes 1 to 24, wherein the bandwidth part has a bandwidth wider than 1.4 MHz.

Supplementary Note 26

The radio communication apparatus according to any one of Supplementary Notes 1 to 25, wherein the frequency band is a frequency band of a cellular system.

Supplementary Note 27

The radio communication apparatus according to any one of Supplementary Notes 1 to 26, wherein the frequency band is a system band or a component carrier.

Supplementary Note 28

A method comprising
performing communication using a first radio transmission scheme within a frequency band; and
performing communication using a second radio transmission scheme within a bandwidth part of the frequency band, radio resources within the bandwidth part being allocable for communication using the second radio transmission scheme.

Supplementary Note 29

A program that causes a processor to execute:
performing communication using a first radio transmission scheme within a frequency band; and
performing communication using a second radio transmission scheme within a bandwidth part of the frequency band, radio resources within the bandwidth part being allocable for communication using the second radio transmission scheme.

Supplementary Note 30

A non-transitory computer readable recording medium having recorded thereon a program that causes a processor to execute:
performing communication using a first radio transmission scheme within a frequency band; and
performing communication using a second radio transmission scheme within a bandwidth part of the frequency band, radio resources within the bandwidth part being allocable for communication using the second radio transmission scheme.

Supplementary Note 31

A system comprising:
a base station; and
a terminal apparatus,
wherein the base station is configured to:
perform communication using a first radio transmission scheme within a frequency band; and
perform communication using a second radio transmission scheme within a bandwidth part of the frequency band, radio resources within the bandwidth part being allocable for communication using the second radio transmission scheme, and
wherein the terminal apparatus is configured to:
perform communication using the first radio transmission scheme within the frequency band; and
perform communication using the second radio transmission scheme within the bandwidth part.

INDUSTRIAL APPLICABILITY

It is possible to perform control related to radio communication more appropriately when radio transmission schemes coexist, in a mobile communication system (cellular system).

REFERENCE SIGNS LIST

1 System
100 Base Station
141 Radio Communication Processing Unit
143 Network Communication Processing Unit
200 Terminal Apparatus
231 Radio Communication Processing Unit
400 Radio Communication Apparatus
410 Radio Communication Processing Unit

What is claimed is:
1. A method performed by a base station, the method comprising:
performing communication using a first radio transmission scheme within a frequency band;
performing communication using a second radio transmission scheme within a bandwidth part of the frequency band, radio resources within the bandwidth part being allocable for communication using the second radio transmission scheme;
transmitting, to a terminal apparatus, first control information indicating the bandwidth part,
wherein a radio resource within the bandwidth part has local identification information for locally identifying the radio resource within the bandwidth part;
transmitting, to the terminal apparatus, the local identification information as resource allocation information,
wherein the communication using the first radio transmission scheme and the communication using the second radio transmission scheme are uplink communication; and
transmitting uplink reference signals for measurements within the bandwidth part and not transmitting the uplink reference signals outside the bandwidth part, when performing uplink communication using the second radio transmission scheme within the bandwidth part.
2. A method performed by a terminal apparatus, the method comprising:
performing communication using a first radio transmission scheme within a frequency band;
performing communication using a second radio transmission scheme within a bandwidth part of the frequency band, radio resources within the bandwidth part being allocable for communication using the second radio transmission scheme;
receiving, from a base station, first control information indicating the bandwidth part, wherein a radio resource within the bandwidth part has local identification information for locally identifying the radio resource within the bandwidth part;

receiving, from the base station, the local identification information as resource allocation information,
wherein the communication using the first radio transmission scheme and the communication using the second radio transmission scheme are downlink communication; and measuring channel quality for the bandwidth part and not measuring channel quality for the other bands of the frequency band.

3. A method performed by a terminal apparatus, the method comprising:

performing communication using a first radio transmission scheme within a frequency band;

performing communication using a second radio transmission scheme within a bandwidth part of the frequency band, radio resources within the bandwidth part being allocable for communication using the second radio transmission scheme;

receiving, from a base station, first control information indicating the bandwidth part,
wherein a radio resource within the bandwidth part has local identification information for locally identifying the radio resource within the bandwidth part;

receiving, from the base station, the local identification information as resource allocation information,
wherein the communication using the first radio transmission scheme and the communication using the second radio transmission scheme are uplink communication; and transmitting uplink reference signals for measurements within the bandwidth part and not transmitting the uplink reference signals outside the bandwidth part, when performing uplink communication using the second radio transmission scheme within the bandwidth part.

* * * * *